United States Patent [19]

Weiler

[11] Patent Number: 4,540,542
[45] Date of Patent: Sep. 10, 1985

[54] METHOD FOR MAKING A CONTAINER WITH A UNITARY BUT REMOVABLE CLOSURE

[75] Inventor: Gerhard H. Weiler, South Barrington, Ill.

[73] Assignee: Automatic Liquid Packaging, Inc., Arlington Heights, Ill.

[21] Appl. No.: 508,734

[22] Filed: Jun. 29, 1983

[51] Int. Cl.³ .............................................. B29C 17/07
[52] U.S. Cl. .................................. 264/524; 264/533; 264/536; 425/524; 425/525; 425/535
[58] Field of Search ............... 264/524, 525, 533, 536; 425/524, 525, 527, 531, 535

[56] References Cited

U.S. PATENT DOCUMENTS

| 3,283,047 | 11/1966 | Savary | 264/533 X |
| 3,487,501 | 1/1970 | Siard et al. | 264/533 X |
| 3,793,421 | 2/1974 | Paubandt | 425/527 X |
| 3,851,029 | 11/1974 | Cornett, III et al. | 264/525 |
| 3,862,698 | 1/1975 | Hafele | 264/536 X |
| 4,143,453 | 3/1979 | Taluba | 425/525 X |

FOREIGN PATENT DOCUMENTS

| 2714917 | 10/1978 | Fed. Rep. of Germany | 264/524 |
| 56-142040 | 11/1981 | Japan | 264/525 |
| 1167513 | 10/1969 | United Kingdom | 264/536 |
| 1236253 | 6/1971 | United Kingdom | 425/531 |

Primary Examiner—Jan Silbaugh
Attorney, Agent, or Firm—Dressler, Goldsmith, Shore, Sutker & Milnamow, Ltd.

[57] ABSTRACT

A method and apparatus are provided for molding a container such as an ampoule with a hermetically sealed top or closure joined to the upper portion of the container with a peripheral frangible web. Main mold halves defining a cavity are provided with an inwardly projecting portion that defines an upwardly facing bearing surface and a forming edge. A mandrel is provided with at least a downwardly facing first frustoconical sealing surface and with a frustoconical engaging surface extending downwardly and inwardly from the downwardly facing first frustoconical sealing surface. The mandrel is adapted to be positioned in a length of parison extending from the main mold means to temporarily seal the parison opening during vacuum or blow forming of the container. The parison is engaged and pressed by the mandrel against the main mold means upwardly facing bearing surface to effect a temporary sealing of at least the mandrel against the parison and to effect a compression of the parison between the mandrel and the forming edge of the main mold means to form a reduced thickness section of parison which, upon subsequent retraction of the mandrel means and upon subsequent formation of the sealed top of the container, defines a peripheral frangible web below the sealed container top.

3 Claims, 9 Drawing Figures

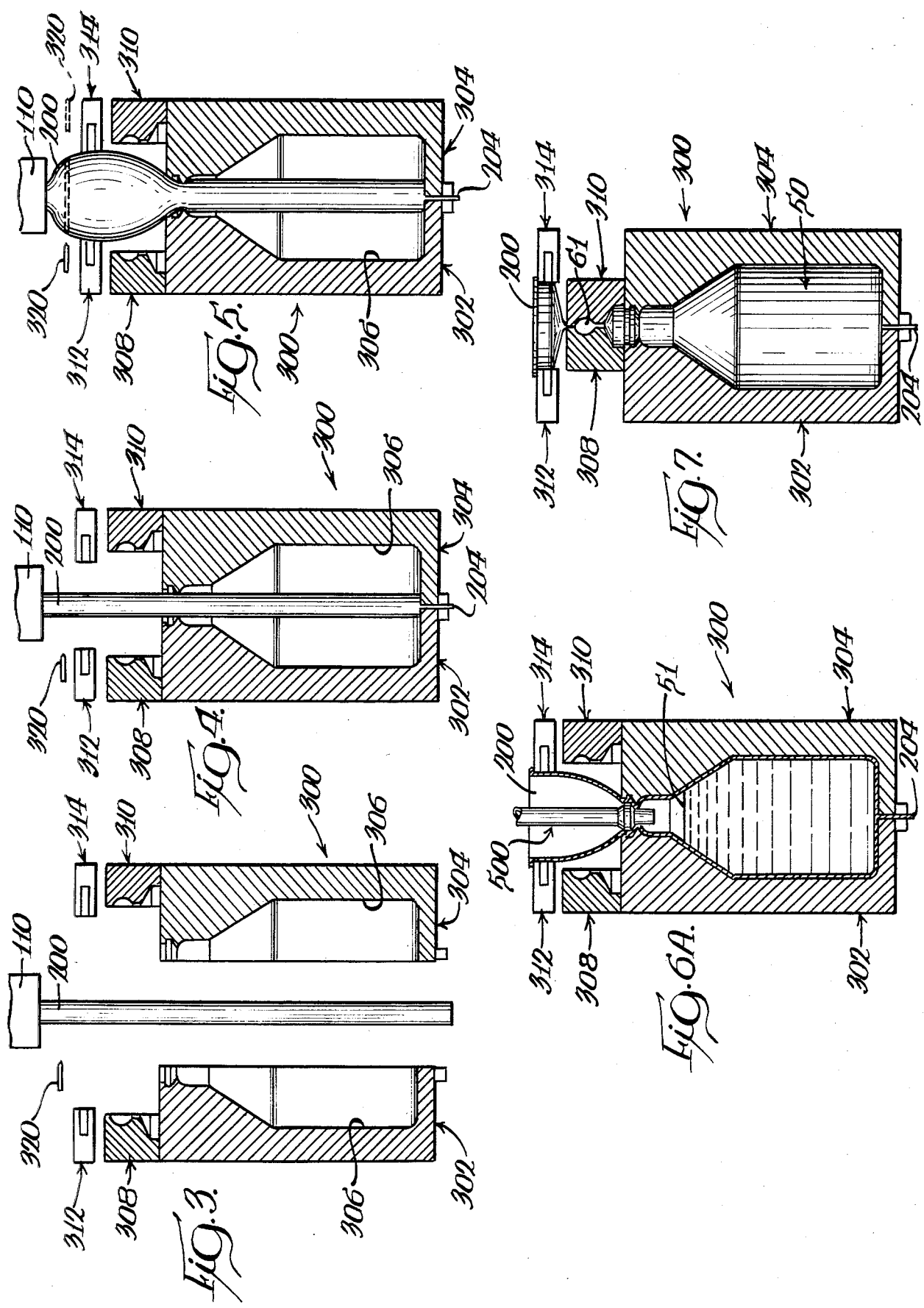

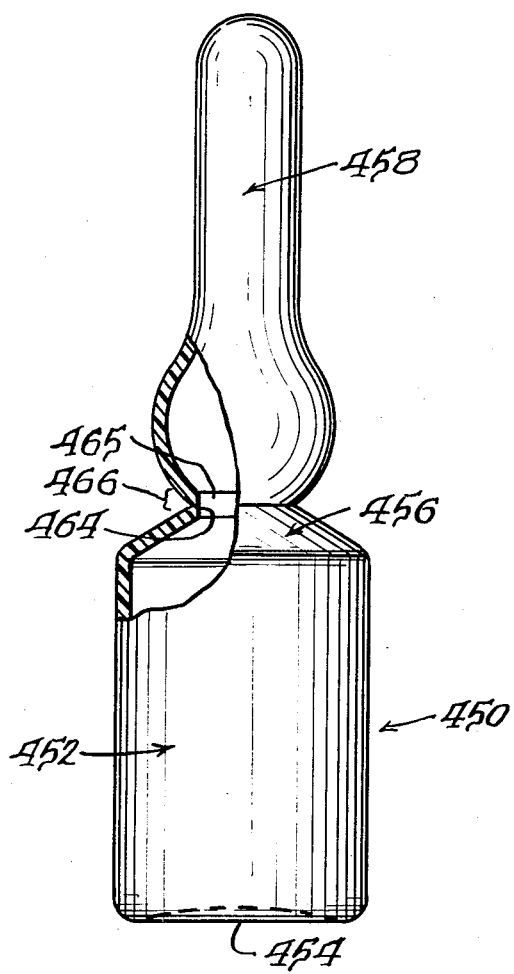

METHOD FOR MAKING A CONTAINER WITH A UNITARY BUT REMOVABLE CLOSURE

TECHNICAL FIELD

This invention relates to a unitary container, such as a vial or ampoule, hermetically sealed with a top or closure structure connected to the container by means of a frangible web.

BACKGROUND OF THE INVENTION

Hermetically sealed containers with unitary closures are known. Such containers typically have a body portion, a neck portion, and a top or closure structure to close and seal the opening in the neck portion.

It is also known to provide such containers with means for permitting the containers to be opened by breaking off the sealed closure at the top of the container or on the neck portion of the container between the container sealed top and the container body portion.

To facilitate such opening of the container, a frangible web is typically provided in the container neck portion. The frangible web comprises a reduced thickness region in the wall of the material forming the neck portion of the container. Such a container is typically opened by twisting or bending the part of the container above the frangible web relative to the part of the container below the frangible web so as to rupture or sever the reduced thickness region of material at the frangible web.

Containers incorporating the above-described frangible web structure are typically formed from a thermoplastic material. Such containers are conventionally fabricated by blow molding and/or vacuum forming and may or may not include an insert article or stopper as part of, or in addition to, the container sealed top or closure structure.

Typically, the thermoplastic material is extruded as a length of parison in the form of a vertically oriented, elongated, hollow tube between the pair of main mold halves for initially forming the container body with an open top. Means are provided for maintaining the opening at the top of the length of parison in the portion of the parison extending upwardly above the main mold means.

An extendable and retractable blowing assembly with a sealing mandrel and blowing nozzle is extended into the length of parison in the main mold halves to temporarily seal the opening. A gas is injected into the parison to mold the container with or without vacuum assist in the mold cavity defined by the main mold halves.

The main mold halves (or other mold members), along with the cooperating sealing mandrel on the blowing assembly, typically define a structure for molding the frangible web structure.

One such apparatus for molding and forming a container with a frangible web is disclosed and illustrated in U.S. Pat. No. 4,239,726. With reference to FIG. 6 in that patent, a mandrel 42, which can be equipped with a container blowing and filling nozzle, is described as being provided with an annular, ring-shaped molding surface 42 that serves to form a frangible annular web around the container hollow stem or collet 12.

Another apparatus for forming a frangible web in a container is illustrated in U.S. patent application Ser. No. 296,368, filed Aug. 26, 1981 and assigned to the assignee of the present invention. In application Ser. No. 296,368, there is disclosed an apparatus for molding a container with a closure article, such as a stopper, inserted in the container opening. The article is disposed within the container opening by means of a pick up arm that is positioned between the main mold halves. Sealing mold halves, located above the main mold halves, are subsequently closed to pinch the parison against the pick up arm above the stopper held at the bottom of the pick up arm. The sealing mold halves have an inwardly projecting frangible web forming means or flange for forming the reduced thickness region of the parison to define the frangible web.

U.S. patent application Ser. Nos. 11,149, filed Feb. 12, 1979, and 194,839, filed Oct. 7, 1980, both assigned to the assignee of the present invention and both now abandoned, illustrate a molding apparatus for producing a container. The container has a rigid dispensing tip with an orifice of a predetermined size and has a rigid but hollow cap closing off the orifice. The cap is unitary with, and connected to, the dispensing tip of the nozzle by means of a unitary, annular frangible web.

The nozzle of the container described in the above-identified U.S. patent application Ser. Nos. 11,149 and 194,839 is formed in the parison at the bottom of the main mold halves. The main mold halves have an interior cavity configuration defining an inwardly projecting flange for cooperating with a ram to form the nozzle and to form the cap structure joined to the nozzle by means of the annular frangible web.

Finally, U.S. Pat. No. 3,597,793 illustrates an apparatus for molding a container and for forming a frangible web in the container. Of interest are the embodiments of the apparatus illustrated in FIGS. 19, 22 and 24. Various forms of a mandrel are shown for cooperating with a pair of main mold halves.

In FIG. 24 of the patent, the mandrel 130 is illustrated as cooperating with the pair of molding jaws 131 to form a weakened, angularly disposed flange 132 between the neck portion 133 of a bottle and the integrally formed closure top 134.

In FIG. 23 of the patent, a mandrel 127 is illustrated with a frustoconical flange 128 which tapers downwardly and outwardly to form a pointed tip 129. The tip 129 cooperates with the tapered surface 126 of the molding jaw halves 125 to form a groove at the juncture between the neck portion of a bottle and the closure top to provide a frangible web.

Finally, FIG. 19 of the patent illustrates a mandrel 119 having a frustoconical wall 118 which extends downwardly inwardly away from a flange or pointed tip 114 to provide a groove or frangible web in the parison.

Although the above-described methods and apparatus for forming frangible webs in containers function satisfactorily for fabricating frangible webs in specific types of containers for which such methods and apparatus were intended, there is no sealing surface within the main mold that is adequate to withstand gas pressures within the main mold cavity while a container is blow molded therein. It would be desirable to provide an improved method and apparatus for forming frangible webs in the neck portion of a container by pressure-assisted molding.

Specifically, it would be desirable to provide improved control of the thickness of the formed frangible web, to provide improved sealing between the sealing mandrel and the parison, and to provide a mandrel that forms, on a consistent and repeatable basis, the frangible web with a smooth surfaced inner wall of a specified diameter.

Further, it would be desirable to provide a method and apparatus wherein the molding assembly and its maintenance could be simplified to permit the formation of the frangible web at the top portion of the main mold halves.

SUMMARY OF THE INVENTION

The present invention provides a method for forming a peripheral frangible web in the wall of a container molded from a parison of semi-soft thermoplastic material in a cavity defined by a pair of coacting main mold parts as well as a novel container made by this method. The method includes the steps of providing in each of the main mold parts a protuberance of substantially cuneiform, i.e., wedge-shaped, cross-section that extends into the mold cavity to form a continuous circumferential ridge having a peak, and pressing a portion of the semi-soft material against the ridge to form a peripheral frangible web having a controlled thickness less than the container wall thickness while providing an effective seal within the main mold to permit the shaping of the container body portion by pressurization from within. Preferably, the semi-soft material is caused to flow across the peak of the circumferential ridge during the pressing. The present invention is particularly well suited for manufacture of hermetically sealed containers from a relatively tougher or harder thermoplastic material such as polypropylene whose vacuum and/or gas pressure are used during the forming process. The containers embodying the present invention include a smooth peripheral band on the container inside that is unitary with the frangible web and defines the inside surface thereof.

Apparatus for practicing the foregoing method includes (1) main mold means defining a mold cavity for initially forming from an extruded length of a parison the container body with an open top, (2) means for maintaining an opening at the top portion of the parison that extends upwardly from the main mold means, (3) an extendable and retractable temporary sealing assembly that includes means for temporarily sealing the top opening and for forming a peripheral frangible web in the container below the top opening (i.e., in the sealed portion of the formed container) in cooperation with the main mold means, and (4) sealing mold means operable upon the upwardly extending portion of the parison above the formed frangible web for permanently sealing the top of the formed container after the temporary sealing assembly is retracted.

The apparatus is characterized by main mold means provided with a circumferential portion projecting inwardly into the mold cavity and defining an upwardly facing bearing surface as well as circumferential, frangible web-forming edge. The main mold means is closable around a portion of the extruded parison length.

The temporary sealing assembly (which may include a blow molding nozzle and/or filling nozzle) is provided with a mandrel having at least (1) a downwardly facing sealing surface and (2) a frustoconical engaging surface extending downwardly and inwardly from the downwardly facing sealing surface. The mandrel is adapted to be moved so that a plurality of sealing surfaces engage the parison and press the parison against the main mold surfaces to effect sealing of the mandrel against the parison and of the parison against the main mold means. This permits formation of the container body by either vacuum molding or by blow molding without gas leakage or blow-by between the mandrel and the parison.

When the mandrel is properly positioned, a predetermined spacing is effected between the mandrel engaging surface and the forming edge on the main mold means. The spacing is less than the wall thickness of the container above and below the forming edge of the main mold means. The forming edge of the main mold means thus cooperates with the mandrel engaging surface to form a reduced thickness section of parison which, upon subsequent retraction of the mandrel, and upon subsequent formation of the permanently sealed top of the container, defines a peripheral frangible web below the sealed container top.

With this method of forming the frangible web, the thickness of the frangible web, and the thickness of the walls on either side of the frangible web, can be more accurately controlled.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same.

Figures 3–6A and FIG. 7 are elevational views, each partly in section, illustrating the apparatus and method of the present invention for forming, filling, and sealing a container;

FIG. 8 is a side elevational view, partly broken away to show interior detail, of an ampoule embodying the present invention.

DESCRIPTION OF THE PREFERRED EMBODIMENT

Figure 1:
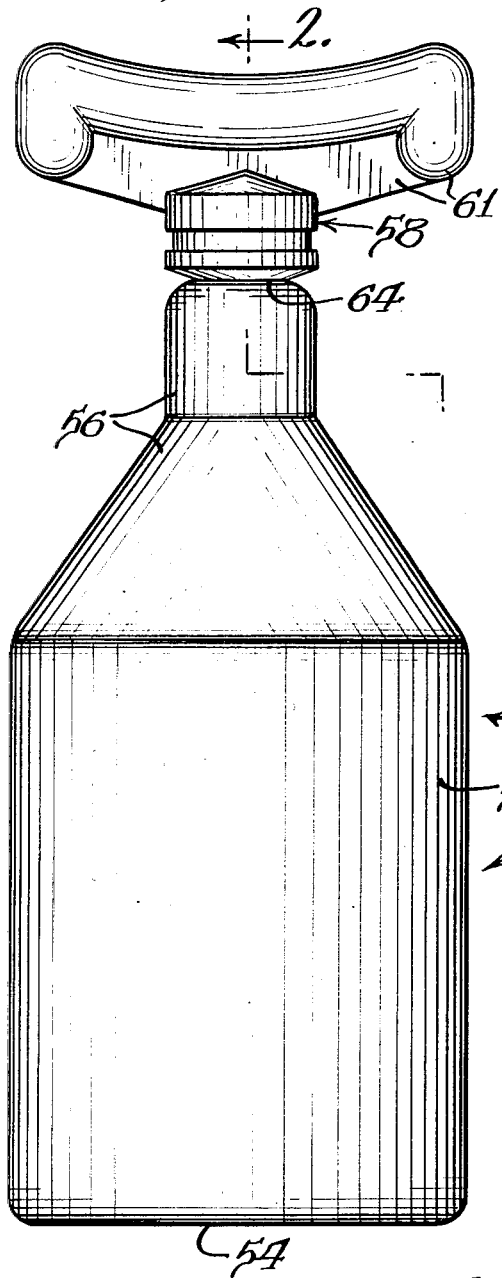
FIG. 1 is a side elevational view of a hermetically sealed container embodying the frangible web and unitary break-off closure fabricated by the apparatus of the present invention in accordance with the teachings of the method of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The precise shapes and sizes of the components herein described are not essential to the invention unless otherwise indicated, since the invention is described with reference to an illustrative embodiment only.

For ease of description, the method of this invention will be described with the apparatus of this invention in a normal operating position, and terms such as upper, lower, horizontal, etc., will be used with reference to this normal operating position. It will be understood, however, that the apparatus may be manufactured, transported, stored, and sold in an orientation other than that illustrated.

Figure 2:
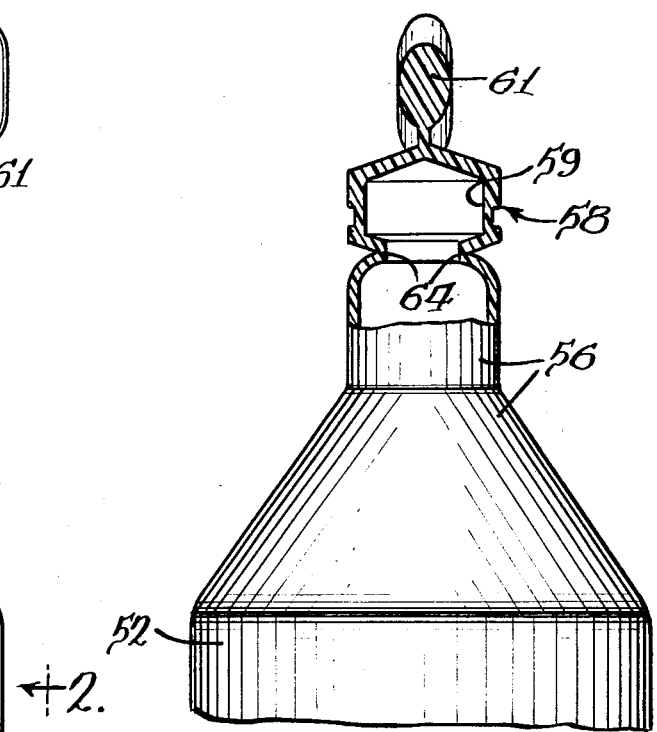
FIG. 2 is an enlarged, fragmentary, partial cross-sectional view taken generally along the planes 2—2 of FIG. 1.

Referring to FIGS. 1 and 2, the hermetically sealed container with unitary break-off closure of the present invention is designated generally by reference numeral 50 and may have a variety of shapes and sizes. The illustrated container is an example of a particular shape that includes a generally cylindrical hollow body portion 52 having a bottom portion 54 and a top portion 56. The top portion 56 of the container terminates in a sealed top or top closure structure 58.

The container closure structure 58 is designed to be removed from the container to permit the contents to be withdrawn or poured from the container. In the preferred form of the illustrated container, the top closure structure 58 defines a hollow chamber 59 (FIG. 2 only) and a graspable tab 61 (FIGS. 1 and 2).

The top closure structure 58 seals the opening of the container top portion 56. The closure structure 58 is joined to the container top portion 56 by means of a unitary, annular, frangible web 64 that circumscribes the container top portion 56. As best illustrated in FIG. 2, the wall thicknesses of the closure structure 58 and of the top portion 56 are greater than the thickness of the peripheral frangible web 64. The frangible web 64 defines a locus of potential fracture at which the separation of the closure structure 58 from the top portion 56 occurs when the container is opened in a manner as is next described in detail. On the container interior the frangible web 64 is defined by a smooth, cylindrical band that is wider than web 64 and on the container exterior by a notched peripheral segment unitary with top closure structure 58 and container top portion 56. Preferably the width dimension of the band is at least about two container wall thicknesses.

To open, the container 50 can be grasped in one hand about the body portion 52 and the tab 61 can be grasped between the thumb and forefinger of the other hand. Next, the tab 61 and closure structure 58 are twisted or bent downwardly relative to the container top portion 56 to cause separation of the closure structure 58 from the top portion 56 of the web 64.

Preferably, at least a portion of the container top portion 56 is relatively rigid compared with the body portion 52 so that the manipulation of the tab 61 and closure structure 58 causes a fracture of the frangible web 64 and a complete separation of the closure structure 58 from the top portion 56.

The method for forming, filling, and sealing the container 50 will next be described with reference to FIGS. 3–7. The apparatus of the present invention is illustrated in a simplified form in FIGS. 3–7.

As best illustrated in FIG. 3, the process for forming the container 50 with the apparatus of the present invention can be initiated at an extruder head 110 of conventional design. The extruder (not illustrated) and head 110 are adapted to extrude a length of parison 200 in the form of a vertically positioned, elongated, hollow tube of semi-soft molding grade thermoplastic material such as low-density polyethylene, high-density polyethylene, polypropylene, or the like.

Before, during, or after the parison 200 is extruded to the desired length, a mold assembly 300 is positioned in spaced relationship from, and around, the parison 200. This position of the mold assembly 300 defines the parison receiving station below the extruder head 110.

The mold assembly 300 includes a lower, first, or main mold means comprising mold half 302 and mold half 304 which together define a mold cavity 306, along with associated conventional operating mechanisms (not illustrated). The assembly 300 also includes a pair of two coacting second or upper sealing mold halves 308 and 310 and a pair of two vacuum operable holding jaws 312 and 314.

The first or main mold halves 302 and 304 cooperate, when moved together, provide the container body defining cavity 306 for the container 50 (FIGS. 3 and 4). Cavity 306 ultimately serves to define the sidewall of the container body portion 52, the container bottom portion 54, the container top portion 56, and a lower portion of the container closure structure 58.

In FIG. 3, the first or main mold halves 302 and 304 are shown in an open position in which they are spaced apart by a distance sufficient to permit the parison 200 to hang between them. The first or main mold halves 302 and 304 are then moved together from the open position illustrated in FIG. 3 to a closed position illustrated in FIG. 4 by suitable operating means, such as by a conventional pneumatic or hydraulic cylinder actuator or actuators (not illustrated). When the main mold halves 302 and 304 are in the closed position illustrated in FIG. 4, the main mold halves 302 and 304 are adapted to form the major portion of the container 50 as will be described in detail hereinafter.

The second or upper sealing mold halves 308 and 310 may be positioned in sliding engagement with the top surfaces of the first or main mold halves 302 and 304. The second or upper sealing mold halves 308 and 310 are preferably mounted or carried by the first or main mold halves 302 and 304 and are thus movable with the main mold halves 302 and 304 between (1) the main mold open position illustrated in FIG. 3 and (2) the main mold closed position illustrated in FIG. 4.

The upper sealing mold halves 308 and 310 are also capable of movement relative to the main mold halves 302 and 304. Specifically, when the main mold halves 302 and 304 are in the main mold closed position, the second or upper sealing mold halves 308 and 310 can be further moved together by suitable conventional actuators (not illustrated) to a sealing position (FIG. 7) to form the container closure structure 58 as will be described in detail hereinafter.

The vacuum operable holding jaws or parison grippers 312 and 314 are adapted to be moved between an extended gripping position and a retracted position. Means for effecting such movement may be provided separately of the means for moving the first and second mold halves. However, jaws 312 and 314 are preferably mounted for movement with the first mold halves 302 and 304. When the first mold halves 302 and 304 are in the open position illustrated in FIG. 3, the holding jaws 312 and 314 are spaced from the parison 200. When the first mold halves 302 and 304 are in the closed position illustrated in FIGS. 4–7, the holding jaws 312 and 314, having moved with the first or main mold halves 302 and 304, are close to the parison and are adapted to engage a portion of the parison 200 that extends upwardly above the closed first mold halves 302 and 304. The jaws 302 and 314 are constructed to grip the parison 200 as a reduced pressure or vacuum is effected by suitable conventional means (not illustrated) between the outer surface of the parison 200 and the inner surfaces of the holding jaws 312 and 314. The parison 200 initially is deformed outwardly to contact the jaws 312 and 314 (as shown in FIG. 5) by means described in detail hereinafter.

When the mold assembly 300 closes about the parison 200 as illustrated in FIG. 4, a portion 204 of the extruded parison projects below the cavity 306 of the first or main mold halves 302 and 304 and forms flash by which the ultimately formed container may be conveyed out of the molding apparatus. The flash may be subsequently severed from, or broken off of, the container bottom.

When the first or main mold halves 302 and 304 are in the closed position illustrated in FIG. 4, the holding jaws 312 and 314 are in the gripping position and ready to engage the upper end of the parison 200 that extends above the first and second pairs of mold halves. At this point in the process, pressurized air is discharged from the extruder head 110 through a suitable conventional tube (not illustrated) to expand the parison slightly so that it comes into contact with the parison grippers or holding jaws 312 and 314 as illustrated in FIG. 5. This parison expansion process is conventional and well known to those skilled in the art. The holding grippers 312 and 314, through the vacuum or reduced pressure effected between the outer surface of the parison 200 and the inner surfaces of the jaws 312 and 314, maintain an opening in the upper end of the parison 200 when the parison is severed from the extruder.

The parison 200 is severed, as illustrated in dashed lines in FIG. 5, above the holding jaws 312 and 314 and below the extruder head 110, by a moving cutter 320, such as a hot wire, a blade or the like while the upper end of the parison 200 is held and prevented from collapsing by the holding jaws 312 and 314. Typically, the cutter 320 is maintained at an elevated temperature to aid in passing through and severing the parison 200.

Depending on the container size, a plurality of containers 50 can be fabricated at one time in a multi-cavity mold assembly. For ease of description, only one mold cavity is illustrated, however, it is to be realized that the mold assembly 300 may include a plurality of cavities aligned in a row and that a plurality of corresponding extruder heads 110 may be provided in a row for simultaneously extruding a length of parison into each such cavity.

The mold assembly 300 is typically mounted on a hydraulically-actuated mold carriage (not illustrated in the simplified FIGS. 3-7) which moves the mold assembly, including the holding jaws 312 and 314, into the parison receiving position below the extruder head 110 (FIGS. 3-5). The carriage also functions to carry the mold assembly 300, with holding jaws 312 and 314, from the parison receiving position beneath the extruder head 110 to a position displaced from the extruder head 110 where the parison 200 is molded (i.e., blow molded or vacuum-formed) into a container shape, then filled, and finally sealed. This latter position of the mold assembly 300 is the molding, filling, and sealing station.

As shown in FIG. 5, typically the mold assembly 300 is moved by the mold assembly carriage (not illustrated) along with holding jaws 312 and 314, away from parison receiving station at the extruder head 110 in a direction normal to the plane of FIG. 5 after the parison 200 has been severed by the cutter 320. The mold carriage usually moves the mold assembly 300 and the holding jaws 312 and 314 a distance of about 30 centimeters to the molding, filling, and sealing station wherein the severed length of parison is molded, filled and sealed as will next be explained.

The molding, filling and sealing station is illustrated in FIG. 6A where the container 50 is shown as having already been molded and then filled with a product 51. Molding can be effected by blow molding, vacuum forming, or a combination of both of the foregoing expedients depending on container size and contour.

At the molding, filling, and sealing station, a vertically reciprocable composite mandrel 500 is provided. With the severed parison properly positioned in the mold assembly at the molding, filling, and sealing station, the composite mandrel 500 is in registry (or is moved into registry) with the opening at the upper end of the severed length of the parison 200. The composite mandrel 500 is then extended downwardly into the opening of the upper end of the severed length of the parison 200 to urge a portion of the parison 200 against the first or main mold halves 302 and 304 as illustrated in FIGS. 6A and 6B so as to temporarily seal the parison opening and to simultaneously form the peripheral frangible web of controlled thickness.

Figure 6B:
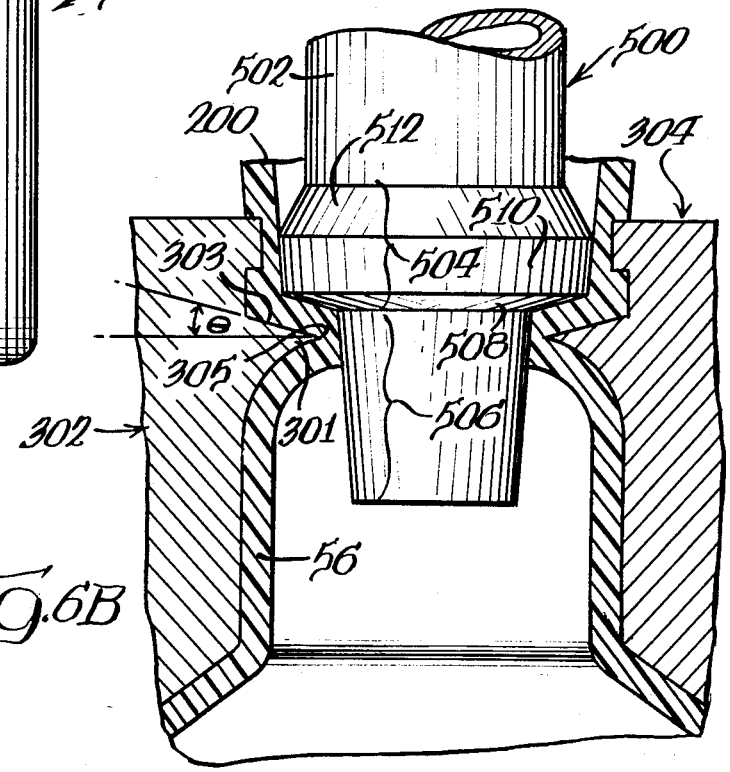
FIG. 6B is an enlarged view of the upper portion of FIG. 6A showing the mandrel configuration in greater detail.

The mandrel 500 preferably includes a conventional blowing tube and a conventional filling tube (neither being visible in FIGS. 6A and 6B). The blowing tube, the filling tube, and the mechanism for moving the composite mandrel 500 up and down may be of suitable conventional designs such as those disclosed in the above-discussed U.S. Pat. No. 3,919,374 and/or found in commercial machines that incorporate a single mandrel for molding and filling a container. However, the exterior shape of the mandrel 500 and the shape of the cooperating adjacent surfaces of the mold halves 302 and 304 are of a unique design, discussed in detail hereinafter, to provide a pressure seal during container formation.

If the mandrel includes a blowing tube, compressed gas, such as air, nitrogen, or the like, is discharged through the mandrel blowing tube into the interior of the hollow parison to inflate the parison outwardly against the walls of the cavity 306 defined by the first or main mold halves 302 and 304 with or without vacuum assist through small passageways in the molds. The compressed gas is typically discharged for about one second. The container is formed as a result of the pressure differential between the exterior of the parison in the main mold means and the interior of the parison.

Next, if the container is to be filled with a product, the filling tube inside the composite mandrel 500 is reciprocated downwardly to open a vent passage in the mandrel 500 to permit venting of the compressed gas out of the molded container. Subsequently, the blowing tube is moved downwardly a small distance within the mandrel 500 so as to open the product dispensing valve and to permit the product 51 (FIG. 6A) to be injected into the formed container from the filling tube.

The product 51 (FIG. 6A), typically a liquid, is usually at a relatively lower temperature than the parison 200 and assists in cooling and thus solidifying the walls of the formed container. After the formed container 50 has been filled with the desired amount of product 51, the composite mandrel 500 is withdrawn from the open end of the parison 200. If it is desired to form an unfilled container, the filling procedure, of course, is omitted and the formed container is cooled by the surrounding mold assembly.

When the composite mandrel 500 has been elevated to a position above the holding jaws 312 and 314, the upper sealing mold halves 308 and 310 are closed as illustrated in FIG. 7 to form the closure structure 58 (including the tab 61). Thus, the filled container 50 becomes hermetically sealed with the unitary closure structure 58.

Subsequently, the sealing mold halves 308 and 310 are opened (along with the main mold halves 302 and 304 and the holding jaws 312 and 314) to permit removal of the formed, filled, and sealed container 50 from the apparatus (as with an automatic transport device, not illustrated, which may grip the flash 204 at the bottom of the container). The flash 204, as well as the extending portion of unmolded parison above the tab 61, may be subsequently severed from, or broken off of, the container 50 by suitable conventional deflashing techniques.

The novel structure of the mandrel 500 and of the cooperating adjacent surfaces of the main mold halves 302 and 304 will now be described with reference to FIG. 6B. The mandrel 500 includes a generally cylindrical tube portion 502 which may contain a blowing tube and a filling tube which may be of conventional design. The distal end of the cylindrical tube portion 502 has an enlarged collar 504 that serves as a first sealing element and a frustoconical or tapered engaging surface 506 that provides a pressure seal between the mandrel and the parison portion within the main mold cavity.

The collar 504 includes a downwardly facing first sealing surface 508 having a generally frustoconical shape, a second sealing surface 510 also having a generally frustoconical shape, and a frustoconical portion 512 joining the top of the second frustoconical sealing surface 510 with the cylindrical tube portion 502 of the mandrel 500.

The first frustoconical sealing surface 508 faces generally downwardly and the second frustoconical sealing surface 510 can also be characterized as facing downwardly, although the inward slant of the second frustoconical sealing surface 510 is relatively slight and less than the slant of the first frustoconical sealing surface 508. Preferably, the angle between the first frustoconical sealing surface 508 and a horizontal plane normal to the longitudinal axis of the mandrel 500 is about 15 degrees.

The frustoconical engaging surface 506 extends downwardly and inwardly from the downwardly facing first frustoconical sealing surface 508. Surface 506 engages a sufficient area of the parison as surface 506 sweeps past peripheral protuberance 301 to form a pressure seal adequate to maintain desired pressurization in the container body portion during its formation. The angle of the surface 506 relative to the longitudinal axis of the mandrel 500 is relatively small. Preferably the angles formed by the surfaces 506 and 510 relative to the longitudinal axis of the mandrel are about equal.

The main sealing mold halves 302 and 304 usually have similar mold surface configurations and will be described here with respect to main mold half 302.

Specifically, main mold half 302 is provided with a protuberance 301 having a substantially cuneiform or wedge-shaped crossection. Protuberance 301 extends around the periphery of that portion of the mold cavity defined by main mold half 302 and into the mold cavity. Protuberance 301, together with a similar protuberance on complementary main mold half 304 define a continuous circumferential ridge having a peak. The circumferential ridge, in turn, defines an upwardly facing frustoconical bearing surface 303 and the peak of the ridge defines an annular forming edge 305.

After the mold halves 302 and 304 have been closed (as illustrated in FIG. 6B) about the parison 200 to form the container and the container body upper portion 56, the mandrel 500 is moved or extended downwardly into the opening of the parison 200 so that the downwardly facing first frustoconical sealing surface 508 of the mandrel sealing element 504 engages the parison 200 and presses the parison against the upwardly facing bearing surface 303 of the main mold halves 302 and 304. This action effects a temporary sealing of the mandrel 500 against the parison 200 and of the parison 200 against the main mold halves 302 and 304 to permit subsequent vacuum forming or blow molding of the container.

Preferably, as illustrated in FIG. 6B, the angle of the bearing surface 303 relative to a plane normal the longitudinal axis of the mandrel 500 is about the same as, if not identical to, the angle of the first frustoconical sealing surface 508 with respect to a plane normal to the longitudinal axis of the mandrel 500. Preferably, this angle is about 15 degrees as stated above in describing the orientation of the first sealing surface 508 of the mandrel 500.

As the mandrel 500 is extended and moved downwardly into the parison opening, the frustoconical engaging surface 506 engages and slides along the parison 200 adjacent the forming edge 305 of the main mold halves 302 and 304. This effects sweeping and squeezing of the parison material in the vicinity of the circumferential ridge and causes the semi-soft parison material to flow across the peak of the ridge.

The diameter of the circle defined by the main mold forming edge 305 and the diameter of the engaging surface 506 adjacent the forming edge 305 are such that therebetween there is an annular space sufficient to accommodate a predetermined thickness of parison which upon solidification comprises the frangible web designated by reference numeral 64 in the completed container illustrated in FIGS. 1 and 2. Control of the dimensions of the engaging surface 506 and the forming edge 305 thus permits the fabrication of a frangible web having a controlled thickness.

In one typical application of this method, the frangible web has a thickness of about 0.005 inch (about 0.13 mm) to about 0.01 inch (about 0.25 mm) whereas the thickness of the wall above and below the web is about 0.025 inch (about 0.64 mm) to about 0.03 inch (about 0.76 mm).

It has been found that the above-described novel mandrel structure and mold structure provide a number of benefits and advantages. Specifically, the inwardly tapering configuration of the frustoconical engaging surface 506 of the mandrel permits a continuous forming and compression of the parison as the mandrel is extended downwardly into the parison. Further, the downwardly facing first frustoconical sealing surface 508 provides for increased positive sealing of the parison to facilitate subsequent blow forming or vacuum forming of the container within the main mold halves 302 and 304. Also, the location of forminq edge 305 permits more precise position and reduces the likelihood of its damage by contact with mandrel 500.

Owing to the inwardly slanting configuration of the frustoconical surfaces 506, 508, and 510, retraction of the mandrel 500 causes these contacting surfaces to be immediately moved away from the parison without any substantial sliding or dragging contact with the formed parison that may still be in a semi-soft state. Thus, in the critical frangible web region, the possibility for disturbing the reduced thickness region of parison adjacent the mold forming edge 305 is eliminated.

With the novel design of the main mold halves 302 and 304 and of the mandrel 500, it is relatively easy to control the reduced thickness of parison comprising the frangible web adjacent the forming edge 305. Further, the capability for repeatedly fabricating containers with substantially identical frangible web thicknesses is enhanced. This is important where it is desired to produce many containers wherein each container must be subsequently cleanly severed by application of substantially the same amount of force.

It is also to be realized that with the novel frangible web forming method and apparatus herein described, the frangible web can be formed within the main mold halves instead of within the sealing molds (such as sealing mold halves 308 and 310 in FIGS. 6A and 7). This permits a more simplified design of the upper sealing mold halves. Further the capability for maintaining alignment of the mandrel and the main mold halves is enhanced.

Another type of hermetically sealed container with unitary break-off closure of the present invention, an ampoule, is illustrated in FIG. 8. In particular, ampoule 450 has body portion 452, bottom portion 454, tip 458, and reduced diameter neck portion 456 joining tip 458 and body portion 452. In turn, neck portion 456 and tip 458 are joined by means of unitary peripheral frangible web 464 defined on the ampoule inside by a smooth cylindrical band 465 and on the ampoule outside by notched, peripheral ampoule segment 466 unitary with tip 458 and neck portion 456. Cylindrical band 465 is wider than the frangible web 464 and provides a pressure seal with the sealing surface 506 of mandrel 500 as the ampoule body portion is formed by pressurization. Preferably, the cylindrical band is of a width equal to at least about two ampoule wall thicknesses.

The ampoule 450 can be fabricated and filled in substantially the same manner as the container 50 shown in FIGS. 1 and 2 above. To open, the ampoule 450 can be held in one hand about its body portion 452 while tip 458 is grasped by another hand and severed by fracturing web 464. A clear separation about the notched segment 466 is obtained without more effort.

Numerous variations and modifications may be effected without departing from the true spirit and scope of the novel concept of the invention. It is to be understood that no limitation with respect to the specific apparatus and method illustrated herein is intended or should be inferred. It is, of course, intended to cover by the appended claims all such modifications as fall within the scope of the claims.

What is claimed is:

1. In a method for molding a container from an extruded length of a parison of semi-soft thermoplastic material in the form of a vertically oriented, elongated, hollow tube wherein said method includes the steps of: (A) closing about said parison a main mold means for defining cavity for subsequently forming the container body with an open top, (B) maintaining an opening at the top of the length of parison in a portion of the parison extending upwardly above the closed main mold means, (C) forming a peripheral frangible web in said parison below said top opening and also temporarily sealing the top opening of the parison, (D) molding the container by a pressure differential between the exterior of the parison in said main mold means and the interior of said parison, and (E) thereafter sealing the top of the formed container with a sealing mold, the improvement characterized in that step (A) includes providing in said main mold means a circumferential portion that projects inwardly into the cavity and defines a forming edge and an upwardly facing bearing surface;

step (C) includes providing a mandrel with a downwardly facing frustoconical sealing surface and a frustoconical engaging surface extending downwardly and inwardly from said sealing surface and extending said mandrel into said parison top opening to (1) force said parison against said main mold means bearing surface with said mandrel sealing surface, and (2) sweep and squeeze said parison adjacent said main mold means forming edge with said mandrel engaging surface; and step (D) includes maintaining said mandrel at a maximum extended position in contact with said parison to (1) effect a temporary seal of said mandrel sealing surface against the parison and of the parison against said closed main mold means bearing surface during molding of the container, and (2) locate said mandrel engaging surface relative to said forming edge of the closed main mold means to retain therebetween a reduced thickness section of a parison whcih, upon subsequent retraction and upon subsequent formation of the sealed top of the container, defines a peripherl frangible web below the sealed container top.

2. The method in accordance with claim 1 wherein said semi-soft material is caused to flow across said circumferential portion during said step (C).

3. The method in accordance with claim 1 wherein the peripheral frangible web is formed having a thickness of about 0.005 to about 0.01 inch.

* * * * *